June 23, 1970   C. D. SIMS   3,516,467
TIRE WITH AUTOMATIC WEAR INDICATING MEANS
Filed March 19, 1968    2 Sheets-Sheet 1
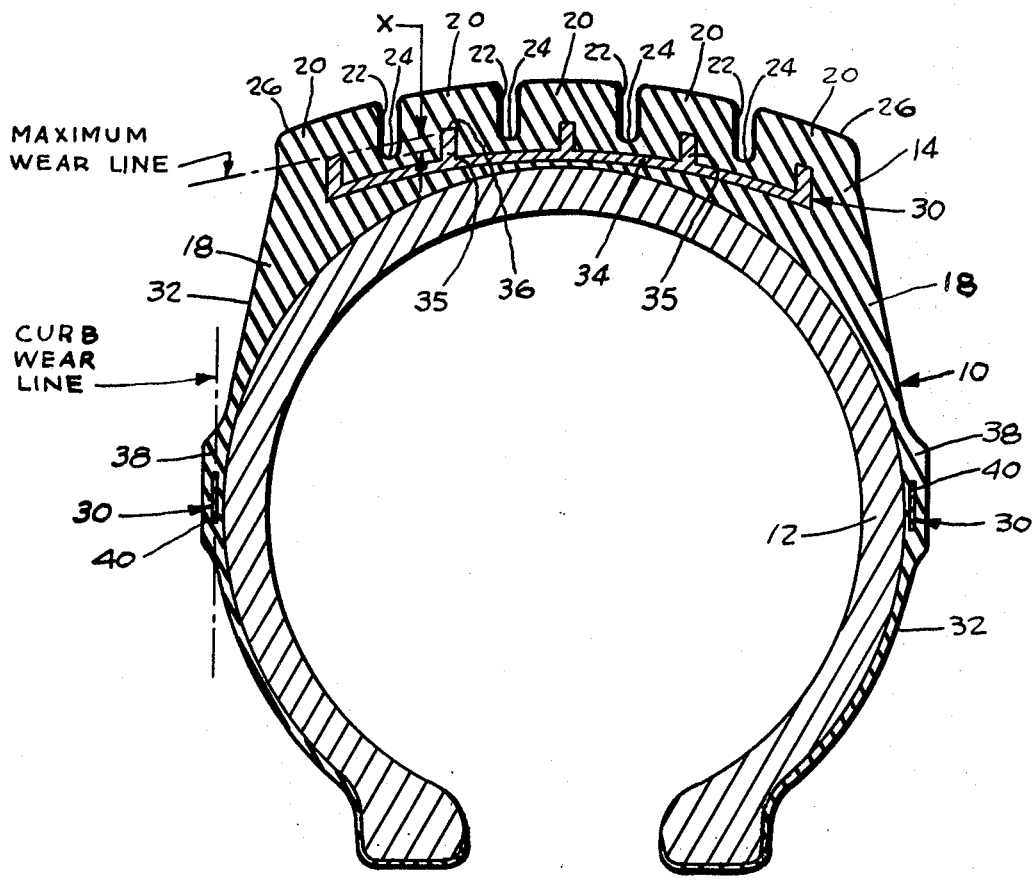
Inventor
CLARK D. SIMS.
by Leonard W. Suroff Atty June 23, 1970  C. D. SIMS  3,516,467
TIRE WITH AUTOMATIC WEAR INDICATING MEANS
Filed March 19, 1968  2 Sheets-Sheet 2
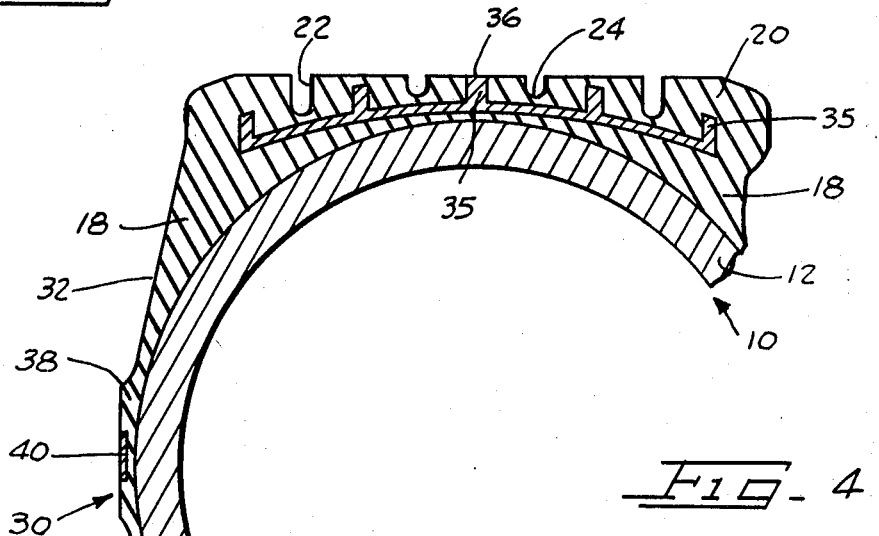
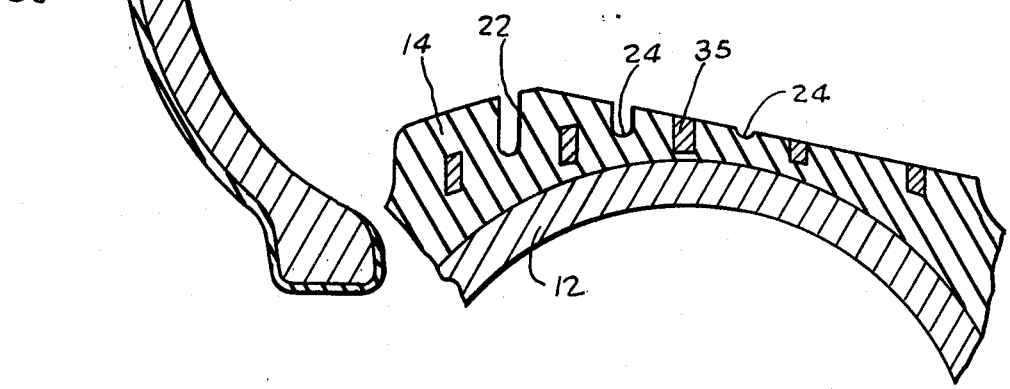
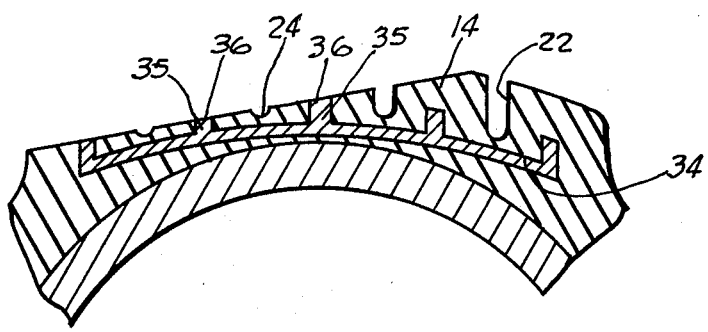
Inventor
CLARK D. SIMS.
by Leonard W. Suroff Atty.

United States Patent Office 3,516,467
Patented June 23, 1970

3,516,467
TIRE WITH AUTOMATIC WEAR INDICATING MEANS
Clark D. Sims, Huntington Station, N.Y. (3604 Ann Circle SE., Rio Rancho Estates, N. Mex. 87124)
Filed Mar. 19, 1968, Ser. No. 714,264
Int. Cl. B60c 19/10
U.S. Cl. 152—330                                    8 Claims

ABSTRACT OF THE DISCLOSURE

A tire for motor vehicles having an indicating device to automatically determine when the tread or sidewall portions of a tire is worn beyond a safe limit for driving.

Summary of the invention

This invention relates in general to improvements in pneumatic tires, and particularly to a tire construction provided with indicating means to indicate when the tread portion or wall portion have been worn to an unsafe limit.

Ever since pneumatic tires have been in use, it has been recognized that a danger exists by using tires too excessive wall thinness, past recommended safe limits. Although many efforts have been made, and continue to be made toward the solution of this problem, no satisfactory solution has to date been provided.

Although many states have a yearly vehicle inspection, this does not prevent many drivers from using "bald" tires for their motor vehicle for at least a major portion of each year prior to or after inspection. This does not only endanger the safety of the driver by other parties who might be innocently involved in automobile accidents due to tire failure. The wear of the tire not only occurs in the tread portion but the sidewall portion as well.

Objectives of the invention

An objective of the invention is to provide a pneumatic tire which will automatically indicate when the thickness of the casing has been worn to an unsafe limit.

Another object of the invention is to provide a pneumatic tire having indicating means embedded within the tread or wall portions and which become automatically visible when the tire reaches an unsafe condition.

Another object of the invention is to provide a pneumatic tire having indicating means contained in the tread portion to indicate when one or more of the individual treads have been worn to an unsafe limit.

Another object of the invention is to provide a pneumatic tire having indicating means embedded in the side wall portion to indicate when the side wall has been worn to an unsafe thickness.

Brief description of the drawings

These and other objects, features and advantages will become more apparent from the following description taken in connection with the accompanying drawings of preferred embodiments of the invention and wherein:

FIG. 1 is a fragmentary transverse sectional view of the tire of the present invention; and FIGS. 2, 3 and 4 are partial fragmentary views similar to FIG. 1 showing the side wall and tread wear.

Discussion of the invention

In the drawings, FIG. 1 shows a tire 10 in accordance with the present invention which includes an inner core 12 and an outer casing 14 secured to each other in any conventional manner. The casing 14 includes a tread portion 16 and a pair of side wall portions 18 integrally formed therewith. The tread portion includes a plurality of circumferentially extending spaced apart treads 20, five being shown for purposes of illustration, to form respective grooves 22, which have a bottom surface 24 in substantially horizontally spaced relation to the top or outer surface 26 of each of the respective treads 20. The above described tire construction is well known in the art and is discussed herein to indicate one form of tire with which the indicating means 30 of the present invention may be utilized.

To clearly indicate when the tire has been worn to an unsafe limit indicating means 30 may be provided in both the tread portion 16 and sidewall portion 18.

The indicating means 30 is embedded within the tire casing 14 in spaced relation from either the outer surface 26 of the tread portion 16 or the outer surface 32 of side wall portion 18, or both, when the tire casing 14 is in its unworn condition. Accordingly, the indicating means 30 becomes visible, as illustrated with respect to FIGS. 2–4 inclusive, when the tire casing 14 has been worn to a condition in which the tire is unsafe for continued use.

With respect to the tread portion 16 the indicating means 30 may include a base portion 34 contained within the casing 14 and including a plurality of ribs 35, integrally formed therewith which extend circumferentially around the entire tire or at spaced apart distances thereon. The ribs 35 extend radially within respective treads 20 and outwardly a distance from said base portion 34 such that the top 36 of each respective rib 35, extends at least to the bottom 24 of an adjacent groove 22. Preferably the top 36 of a respective rib 35 extends past the groove bottom 24 a selected distance X, so that the rib top 36 becomes visible prior to the tread 20 being entirely worn to the bottom of the groove 22. The distance X is selected to comply with at least the minimum tread requirements for a given tire and which dimension indicates the maximum wear line for the tire to be used safely.

With respect to the indicating means 30 contained in the side wall portion 18, an annular bead 38 may be provided on each of the respective sidewalls with the rib portion 40 contained below the outer surface 32 thereof a given preselected distance which when the rib 40 becomes visible as illustrated in FIG. 2 the tire is unsafe for future use.

The annular bead 38 is spaced from the outer surface 26 of the casing 14, a distance normally designed to be assured that the bead 38 would engage the curb in parking the motor vehicle as indicated by the curb wear line. In this way if the tire side wall becomes too thin the tire would be removed. On tires containing a white or colored band then the bead 38 need only be provided on this side since it is unlikely that the tire would be used with the other side facing out.

FIG. 2 illustrates the wear of a tire which is well balanced and the respective tires of the motor vehicle are in line with each other so that equal wear is obtained on the treads 20 and on the side wall bead 38. In this manner the central rib 40 becomes visible first and the owner by checking his tires from time to time will see when the tire becomes excessively worn.

FIGS. 3 and 4 illustrate a motor vehicle tire which is not properly balanced so that the treads 20 do not wear evenly, but the ribs 35 are likewise visible. FIG. 4 shows a modification in that the ribs 35 are not secured to each other with a base portion but may be individual as in the form of an annular ring as the rib 40.

The indicating means 30 is preferably made of a material which is of a contrasting color or material as for example, rubber, metallic or plastic. For example, a white colored rubber material may be incorporated into the tire in any conventional manner. In addition the indicating means 30 may be designed to form an integral part of the tire to lend structural rigidity thereto. For example, if the base 34 is of a metallic material it acts as an annular shell which increases the radial pressures the tire can withstand. In addition if the ribs are also of metal it acts to further strengthen the tire casing. But in each instance it is important that the rib portion be of a material distinguishable from the casing material so that it is visible to the user.

This invention is also adaptable to be incorporated in a tire with a removable tread ring. In this type of tire construction the tread ring is generally in the form of a radial disc that is positioned within a groove in the tire casing. In accordance with this invention, the radially extending rings may fit into blind bores on the inner surface of the tire ring, such that when it is worn a given amount, the ribs also become visible.

Whereas the present invention has been described in particular relation to the drawings illustrated herein, it should be apparent that other and further modifications, apart from those shown or suggested herein, might be made within the spirit and scope of this invention.

I claim:
1. A tire for motor vehicle wheels, comprising:
   (a) a casing having a tread portion and a side wall portion, said tread portion includes a plurality of circumferentially extending spaced apart treads to form respective grooves therebetween, and
   (b) wear indicating means embedded within said casing in spaced relation from the outer surface of said tread portion when said casing is in its unworn condition, said indicating means being visible when said casing has been worn to a condition in which said tire is unsafe for use, said indicating means includes:
      (1) an annular base portion contained below the bottom of said respective grooves,
      (2) a plurality of annularly extending spaced apart ribs integrally formed with said base portion and spaced to extend within respective treads of said tread portion, each of said ribs extending outwardly past the bottom of its adjacent groove, wherein said respective ribs become visible prior to the tread it is contained within being entirely worn to the bottom of said groove,
      (3) said ribs being of a material distinguishable from said casing material, whereby said ribs are easily visible when the tire has been worn to an unsafe condition.

2. A tire as claimed in claim 1, wherein said rib is of a material having a color different from said casing to obtain the distinguishability.

3. A tire as claimed in claim 1, wherein the horizontal spacing between said rib portion and the bottom of said adjacent groove is selected to comply with at least the minimum tread requirements for said tire.

4. A tire as claimed in claim 1,
   (a) wherein said side wall portion includes an outwardly extending peripheral annular bead, and
   (b) wherein said indicating means further includes a rib portion contained below the outer surface of said annular bead, said rib portion being visible prior to said bead being entirely worn to a position wherein said tire becomes unsafe for use.

5. A tire as claimed in claim 4, wherein said annular bead is spaced from the outer surface of said casing a distance to normally engage a curb when the motor vehicle is being parked.

6. A tire as claimed in claim 5, wherein said rib portion is of a material distinguishable from said casing material, whereby said rib portion is easily visible to the user.

7. A tire as claimed in claim 6, wherein said rib is of a material having a color different from said casing to obtain the distinguishability.

8. A tire for motor vehicle wheels, comprising:
   (a) a casing having a tread portion and a side wall portion, said side wall portion includes an outwardly extending peripheral annular bead,
   (b) said tread portion includes a plurality of circumferentially extending spaced apart treads to form respective grooves therebetween, and
   (c) wear indicating means embedded within said casing in spaced relation from the outer surface of said tread portion and said side wall portion when said casing is in its unworn condition, said indicating means being visible when said casing has been worn to a condition in which said tire is unsafe for use,
      (1) an annular base portion contained below the bottom of said respective grooves,
      (2) a plurality of annularly extending spaced apart ribs integrally formed with said base portion and spaced to extend within respective treads of said tread portion, each of said ribs extending outwardly past the bottom of its adjacent groove, wherein said respective ribs become visible prior to the tread it is contained within being entirely worn to the bottom of said groove,
      (3) a side wall rib contained below the outer surface of said annular bead, said rib portion being visible prior to said bead being entirely worn to a position wherein said tire becomes unsafe for use,
      (4) said ribs being of a material distinguishable from said casing material, whereby said ribs are easily visible when the tire has been worn to the unsafe condition.

References Cited

UNITED STATES PATENTS 3,261,388  7/1966  Kovac _____ 152—330

FOREIGN PATENTS 724,463  12/1965  Canada.

GEORGE E. LOWRANCE, Primary Examiner

U.S. Cl. X.R.

152—353